United States Patent
Mayer et al.

(10) Patent No.: US 7,624,623 B2
(45) Date of Patent: Dec. 1, 2009

(54) INSTRUMENT AND METHOD FOR DETECTING LEAKS IN HERMETICALLY SEALED PACKAGING

(75) Inventors: Daniel W. Mayer, Wyoming, MN (US); Timothy A. Ascheman, Ramsey, MN (US)

(73) Assignee: Mocon, Inc., Minneapolis, MN (US)

( * ) Notice: Subject to any disclaimer, the term of this patent is extended or adjusted under 35 U.S.C. 154(b) by 196 days.

(21) Appl. No.: 10/597,682

(22) PCT Filed: Dec. 13, 2005

(86) PCT No.: PCT/US2005/045133

§ 371 (c)(1),
(2), (4) Date: Aug. 3, 2006

(87) PCT Pub. No.: WO2006/076110

PCT Pub. Date: Jul. 20, 2006

(65) Prior Publication Data

US 2007/0266773 A1    Nov. 22, 2007

Related U.S. Application Data

(60) Provisional application No. 60/642,746, filed on Jan. 10, 2005.

(51) Int. Cl.
*G01M 3/34* (2006.01)

(52) U.S. Cl. .................. 73/49.3; 73/864.81; 73/864.74; 73/195; 73/204.11

(58) Field of Classification Search .................. 73/49.3, 73/864.81, 864.74, 861–861.69, 195–281, 73/204.11–204.27, 861.42–861.94
See application file for complete search history.

(56) References Cited

U.S. PATENT DOCUMENTS 3,466,925 A   9/1969   Ziegehagen et al.

(Continued)

FOREIGN PATENT DOCUMENTS

DE   4212938 A1   10/1993

(Continued)

OTHER PUBLICATIONS

Hanson, et al., "In Quest of Sterile Packaging: Part 1, Approaches to Package Testing", Medical Device & Diagnostic Industry, Aug. 1995, pp. 56-61.

(Continued)

*Primary Examiner*—Hezron Williams
*Assistant Examiner*—Gunnar J Gissel
(74) *Attorney, Agent, or Firm*—Sherrill Law Offices, PLLC

(57) ABSTRACT

An instrument for detecting leaks in a hermetically sealed package. The instrument includes (i) a hollow needle, (ii) a mass flow rate sensor in sealed fluid communication with the lumen defined by the hollow needle, and (iii) a vacuum pump. The vacuum pump is in fluid communication with the lumen defined by the needle for evacuating gas from the hermetically sealed package, and in fluid communication with the mass flow rate sensor for directing mass flow from the evacuated package into operable contact with the mass flow rate sensor so as to permit sensing of any continuing mass flow from the evacuated package. The instrument may further include an oxygen sensor in sealed fluid communication with the lumen defined by the hollow needle for analyzing the oxygen concentration of the gas within the hermetically sealed package.

4 Claims, 1 Drawing Sheet

U.S. PATENT DOCUMENTS

| | | | |
|---|---|---|---|
| 3,498,110 A | 3/1970 | Burn | |
| 3,555,884 A | 1/1971 | Yamamoto et al. | |
| 3,561,254 A | 2/1971 | Argaud at al. | |
| 3,636,751 A | 1/1972 | Pasini, III et al. | |
| 3,672,207 A | 6/1972 | Cramp et al. | |
| 3,762,212 A | 10/1973 | Morley et al. | |
| 3,849,070 A * | 11/1974 | Garza et al. | 436/133 |
| 3,855,531 A | 12/1974 | Fielibert et al. | |
| 3,952,580 A | 4/1976 | Bennett | |
| 3,956,923 A | 5/1976 | Young et al. | |
| 4,104,905 A | 8/1978 | Zachary | |
| 4,133,736 A * | 1/1979 | Nakagawa et al. | 204/409 |
| 4,145,916 A | 3/1979 | Bott et al. | |
| 4,424,708 A | 1/1984 | Meuleman | |
| 4,555,934 A | 12/1985 | Freeman et al. | |
| 4,561,289 A | 12/1985 | Jones | |
| 4,593,554 A | 6/1986 | Aarts | |
| 4,622,643 A | 11/1986 | Dotson | |
| 4,627,270 A | 12/1986 | Jones | |
| 4,643,019 A | 2/1987 | Jones | |
| 4,671,100 A | 6/1987 | Doussiet | |
| 4,715,212 A | 12/1987 | Johanson | |
| 4,747,299 A | 5/1988 | Fox et al. | |
| 4,750,918 A | 6/1988 | Sirkar | |
| 4,774,830 A | 10/1988 | Hulsman | |
| 4,776,206 A * | 10/1988 | Armstrong et al. | 73/40 |
| 4,791,806 A | 12/1988 | Wade | |
| 4,852,415 A | 8/1989 | Bogatzki et al. | |
| 4,899,574 A | 2/1990 | Potteiger | |
| 4,922,746 A | 5/1990 | Hulsman et al. | |
| 4,934,180 A | 6/1990 | Hulsman | |
| 4,991,574 A | 2/1991 | Pocknell | |
| 5,042,291 A | 8/1991 | Lehmann | |
| 5,149,105 A | 9/1992 | Beaver et al. | |
| 5,150,605 A | 9/1992 | Simpson | |
| 5,156,329 A | 10/1992 | Farrell | |
| 5,163,315 A | 11/1992 | Asai et al. | |
| 5,203,822 A * | 4/1993 | Gurich et al. | 73/149 |
| 5,212,993 A * | 5/1993 | Mayer | 73/864.21 |
| 5,226,316 A | 7/1993 | Mally et al. | |
| 5,285,678 A * | 2/1994 | McDaniel et al. | 73/49.3 |
| 5,307,696 A * | 5/1994 | Allain et al. | 73/864.74 |
| 5,319,957 A | 6/1994 | Stieger et al. | |
| 5,333,491 A | 8/1994 | Lehmann | |
| 5,345,814 A | 9/1994 | Cur et al. | |
| 5,365,774 A | 11/1994 | Horlacher | |
| 5,404,747 A | 4/1995 | Johnston et al. | |
| 5,433,120 A * | 7/1995 | Boyd et al. | 73/863.81 |
| 5,497,654 A | 3/1996 | Lehmann | |
| 5,499,529 A | 3/1996 | Kronberg et al. | |
| 5,513,516 A | 5/1996 | Stauffer | |
| 5,564,306 A | 10/1996 | Miller | |
| 5,591,899 A | 1/1997 | Griesbeck | |
| 5,728,929 A | 3/1998 | Gevaud | |
| 5,777,203 A | 7/1998 | Stymne | |
| 5,831,147 A | 11/1998 | Hoath | |
| 5,850,036 A | 12/1998 | Giromini | |
| 5,891,076 A | 4/1999 | Fabo | |
| 5,915,270 A | 6/1999 | Lehmann | |
| 5,919,476 A | 7/1999 | Fischer et al. | |
| 5,939,619 A | 8/1999 | Achter et al. | |
| 6,018,987 A | 2/2000 | Mayer et al. | |
| 6,050,133 A | 4/2000 | Achter et al. | |
| 6,139,801 A * | 10/2000 | Kawachi et al. | 422/88 |
| 6,308,556 B1 | 10/2001 | Sagi et al. | |
| 6,324,926 B1 * | 12/2001 | Lehtinen et al. | 73/864.24 |
| 6,354,138 B1 | 3/2002 | Ascheman et al. | |
| 6,382,011 B1 | 5/2002 | Mayer et al. | |
| 6,450,011 B1 | 9/2002 | Mayer et al. | |
| 6,450,012 B1 | 9/2002 | Mayer et al. | |
| 6,460,405 B1 | 10/2002 | Mayer et al. | |
| 6,609,414 B2 | 8/2003 | Mayer et al. | |
| 6,935,199 B2 * | 8/2005 | Wickland et al. | 73/864.74 |
| 7,252,014 B1 * | 8/2007 | Mayer et al. | 73/861 |
| 2002/0069691 A1 | 6/2002 | Roberts et al. | |
| 2006/0011237 A1 | 1/2006 | Tison et al. | |
| 2007/0266773 A1 | 11/2007 | Mayer et al. | |
| 2007/0289390 A1 * | 12/2007 | Ascheman | 73/861 |

FOREIGN PATENT DOCUMENTS

| | | |
|---|---|---|
| EP | 0445002 A2 | 4/1991 |
| EP | 0646781 | 4/1995 |
| JP | 57127830 A | 8/1982 |
| JP | 2122234 A | 5/1990 |
| WO | 2006/076110 A2 | 7/2006 |
| WO | 2006/083400 A2 | 8/2006 |

OTHER PUBLICATIONS

Jones, et al., "In Quest of Sterile Packaging: Part 2, Physical Package Integrity Test Methods", Medical Device & Diagnostic Industry, Sep. 1995, pp. 81-85.

Arndt, George W. Jr., "Examination of Containers for Integrity", Bacteriological Analytical Manual Online, Jan. 2001, pp. 1-31., United States Food & Drug Administration.

* cited by examiner

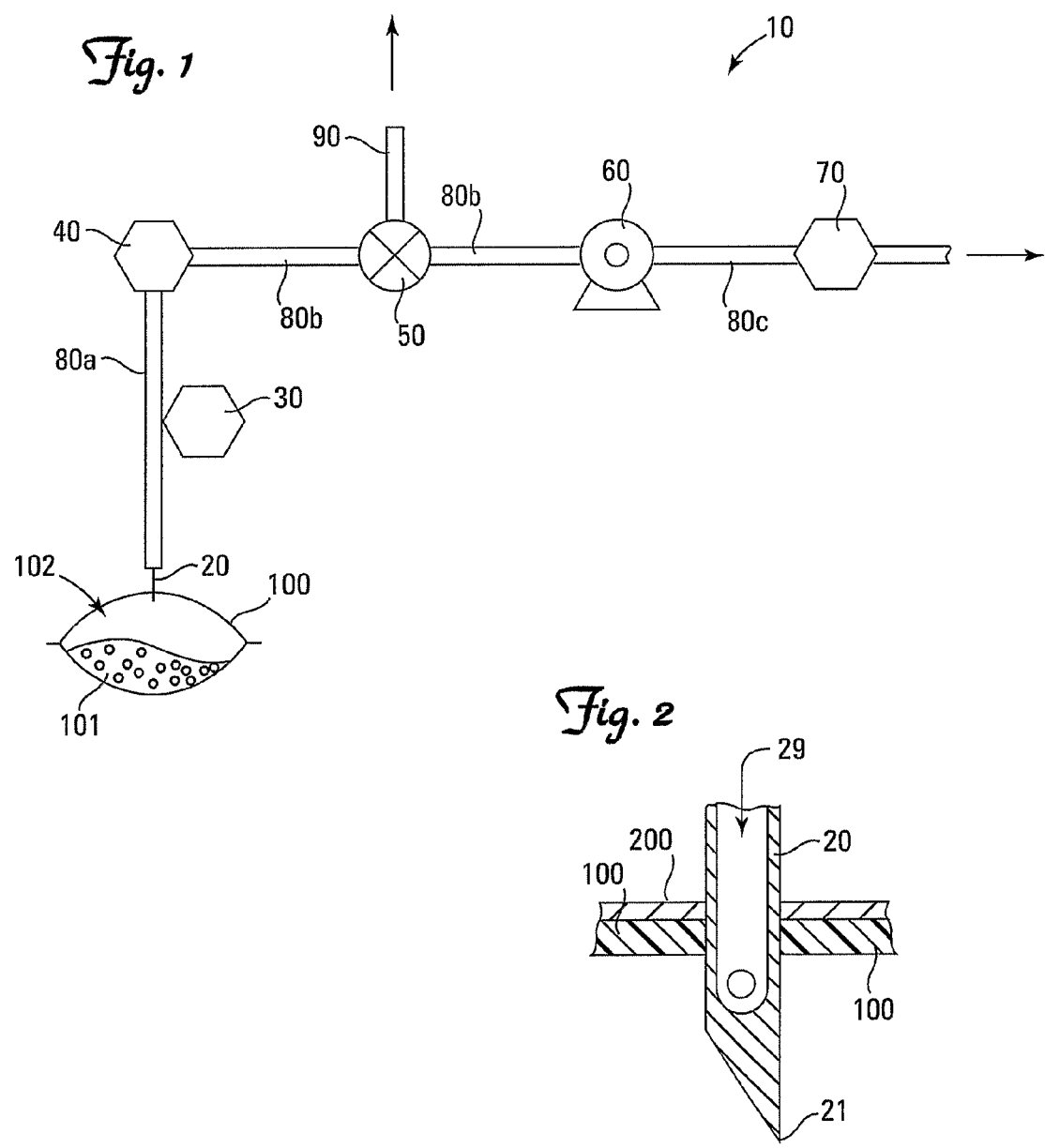

INSTRUMENT AND METHOD FOR DETECTING LEAKS IN HERMETICALLY SEALED PACKAGING

FIELD OF INVENTION

The invention relates to instrument and techniques for analyzing the oxygen concentration within hermetically sealed packaging, and detecting leaks in hermetically sealed packaging.

BACKGROUND

Products susceptible to spoilage, such as processed foods, nuts and sliced fruits and vegetables, are often placed in hermetically sealed packaging which has been flushed with an inert gas, such as nitrogen or argon, to achieve an oxygen concentration within the packaging of less than about 3% and thereby prolong the shelf-life of the product. Such packaging is commonly known as controlled atmosphere packaging (CAP) or modified atmosphere packaging (MAP).

Insufficient flushing of the atmosphere within the packaging and/or leaks in the packaging can significantly reduce the anticipated shelf life, resulting in undesired spoilage. Hence, proper quality control efforts for CAP/MAP typically involve at least periodic testing of packaging to determine the oxygen content within the hermetically sealed packaging and the presence of any leaks in the packaging.

A variety of instruments and methods for analyzing the oxygen concentration within the headspace of CAP/MAP are known to those skilled in the art, including the PAC CHECK® series of oxygen headspace analyzers offered by MOCON, Inc. of Minneapolis, Minn. Briefly, these instruments involve puncturing a sample package with a hollow needle through which a sample of the headspace gases can be withdrawn for analysis by an oxygen sensor. See, U.S. Pat. No. 5,212,993 issued to William Mayer, the disclosure of which is hereby incorporated by reference.

A variety of instruments and methods are also known for leak detection in hermetically sealed packaging. Leak detection typically involves the creation of a pressure differential between the pressure inside the packaging (internal pressure) and the pressure outside the packaging (external pressure)—such as by compressing the packaging or pulling a vacuum in the atmosphere surrounding the packaging, followed by the detection of any change in a given variable which could be correlated to the presence of a leak in the packaging. Specific examples include submersion of the packaging into a liquid and detecting any liquid within the packaging (U.S. Pat. No. 6,763,702 issued to Allen Chien et al.), squeezing of the packaging and detecting of any pressure decay (U.S. Pat. No. 6,427,524 issued to Frank Raspante et al.), squeezing the packaging and detecting any volume decay (U.S. Pat. No. 5,533,385 issued to William Frievalt) and placing the packaging within a vacuum chamber and detecting any loss of vacuum (U.S. Pat. No. 5,150,605 issued to Edwin Simpson).

While each of these instruments and techniques are generally effective for analyzing the oxygen concentration within hermetically sealed packaging, or detecting leaks in hermetically sealed packaging, a substantial need continues to exist for (i) a quick, easy, inexpensive and accurate instrument and technique for detecting leaks in hermetically sealed packaging, and (ii) an instrument and technique capable of providing both an accurate analysis of the oxygen concentration within hermetically sealed packaging and the detection of any leaks in the hermetically sealed packaging using the same individual package and using a single integrated instrument to conduct both tests.

SUMMARY OF THE INVENTION

A first aspect of the invention is an instrument for detecting leaks in hermetically sealed packaging. The instrument includes (a) a needle having a lumen, (b) a mass flow rate sensor, and (c) a vacuum pump. The mass flow rate sensor is in sealed fluid communication with the lumen defined by the needle. The vacuum pump is in fluid communication with both the lumen defined by the needle and the mass flow rate sensor for evacuating gas from the hermetically sealed packaging and allow the mass flow rate sensor to sense any continuing mass flow from the evacuated packaging.

A second aspect of the invention is an instrument for analyzing oxygen concentration of a gas within hermetically sealed packaging and detecting leaks in the hermetically sealed packaging. The instrument includes (a) a needle having a lumen, (b) an oxygen sensor, (c) a mass flow rate sensor, and (d) a vacuum pump. The oxygen sensor and the mass flow rate sensor are in sealed fluid communication with the lumen defined by the needle. The vacuum pump is in fluid communication with the lumen defined by the needle and both the oxygen sensor and the mass flow rate sensor for (A) pumping a sample of a gas from within a hermetically sealed packaging through the lumen of the needle and into operable contact with the oxygen sensor for permitting sensing of an oxygen concentration of the sample, (B) evacuating the gaseous content of the hermetically sealed packaging, and (C) allow the mass flow rate sensor to sense any continuing mass flow from the evacuated packaging.

A third aspect of the invention is a method of detecting leaks in hermetically sealed packaging. The method involves (a) selecting a hermetically sealed packaging, (b) puncturing the hermetically sealed packaging with a hollow needle having a lumen, (c) evacuating any gaseous content from within the hermetically sealed packaging through the lumen of the needle to form a vacuum within the hermetically sealed packaging, and (d) measuring mass flow rate from within the evacuated hermetically sealed packaging. Sensing of a mass flow rate from the evacuated hermetically sealed packaging above a threshold value indicates a leak in the hermetically sealed packaging.

A fourth aspect of the invention is a method of analyzing oxygen concentration of a gas within hermetically sealed packaging and detecting leaks in the hermetically sealed packaging. The method involves (a) selecting a hermetically sealed packaging, (b) puncturing the hermetically sealed packaging with a hollow needle having a lumen, (c) pumping a sample of the gas within the hermetically sealed packaging through the lumen of the needle and into operable contact with an oxygen sensor for sensing the oxygen concentration in the sample, (d) evacuating the gaseous content from within the hermetically sealed packaging through the lumen of the needle to form a vacuum within the hermetically sealed packaging, and (e) measuring mass flow rate from the evacuated hermetically sealed packaging. Sensing of a mass flow rate from the evacuated hermetically sealed packaging above a threshold value indicates a leak in the hermetically sealed packaging.

BRIEF DESCRIPTION OF THE DRAWINGS

FIG. 1 is a side view of one embodiment of the invention.

FIG. 2 is an enlarged cross-sectional side view of the distal end of the needle shown in FIG. 1.

DETAILED DESCRIPTION OF THE INVENTION INCLUDING A BEST MODE

Nomenclature

10 Instrument
20 Needle
21 Distal End of Needle
29 Lumen of Needle
30 Pressure Sensor
40 Oxygen Sensor
50 Valve
60 Vacuum Pump
70 Mass Flow Rate Sensor
80 Collective Reference to Tubing 80a, 80b and 80c
80a Length of Tubing Interconnecting the Needle and the Oxygen Sensor
80b Length of Tubing Interconnecting the Oxygen Sensor and the Vacuum Pump
80c Length of Tubing Interconnecting the Vacuum Pump and the Mass Flow Rate Sensor
90 Vent
100 Packaging
101 Solids Content of Packaging
102 Gaseous Content of Packaging
200 Septum

Structure

As shown in FIG. 1, a first aspect of the invention is an instrument 10 for analyzing the oxygen concentration of the gaseous content 102 of hermetically sealed aging 100 and detecting leaks in the hermetically sealed packaging 100.

The instrument 10 can be effectively employed with a wide variety of hermetically sealed packaging 100 ranging from rigid packaging such as poly vinyl chloride tubes, through semi-flexible packaging such as wax-coated cartons and thin-walled polyethylene bottles, to flexible packaging such as bags made from polyethylene terephthalate (i.e., MYLAR®) or polyethylene films.

Referring to FIG. 1, the first aspect of the instrument 10 includes a needle 20, a pressure sensor 30, an oxygen sensor 40, an optional valve 50, a vacuum pump 60, a mass flow rate sensor 70, and appropriate tubing 80a, 80b and 80c (hereinafter collectively referenced as tubing 80) for sealingly interconnecting the various components of the instrument 10.

As shown in FIG. 2, the needle 20 is configured and arranged with a lumen 29 and a sharp pointed distal end 21 effective for piercing a sidewall (unnumbered) of the packaging 100. A septum 200 is preferably adhered to the sidewall of the packaging 100—especially when the packaging 100 is highly flexible—prior to piercing of the packaging 100 with the needle 20 in order to maintain a hermetic seal around the needle 20.

Referring to FIG. 1, a vacuum pump 60 is sealingly connected to the lumen 29 of the needle 20 by tubing 80. Once the needle 20 has been inserted through packaging 100, operation of the vacuum pump 60 is effective for pulling a sampling of the gaseous content 102 of the packaging 100 out from the packaging 100 through the lumen 29 of the needle 20 and into operable contact with an oxygen sensor 40.

Substantially any type of vacuum pump 60 is suitable for use in the instrument 10, with selection dependent primarily upon choice of power source (i.e., battery or electrical power lines), desired level of portability (i.e., hand-held or desk-top), and intended use (i.e., testing of large volume or small volume packaging). For most applications, a vacuum pump 60 with a maximum gas volumetric flow rate of about 250 to 1,000 cm$^3$/minute and capable of pulling a maximum vacuum of about 1-15 lb/in$^2$, preferably 4-8 lb/in$^2$, using standard consumer batteries (e.g., AAA, AA, A, C, D or 9-volt batteries) will be sufficient.

The oxygen sensor 40 may be selected from any of a wide variety of oxygen sensors readily available from a number of sources, such as the PAC CHECK® series of oxygen headspace analyzers offered by MOCON, Inc. of Minneapolis, Minn. The oxygen sensor 40 is preferably positioned upstream from the vacuum pump 60 to avoid potential contamination of the gas sample taken from the packaging 100 for analysis.

As described in detail in U.S. Pat. No. 5,212,993, the disclosure of which is hereby incorporated by reference, a valve 50, such as a 3-way valve, is preferably positioned between the oxygen sensor 40 and the vacuum pump 60 for permitting the pressure of a gas sample pulled from the packaging 100 into the oxygen sensor 40 by the pump 60 to be normalized prior to analysis. Such normalization of the gas sample pressure has been found to enhance the accuracy of the analysis.

A mass flow rate sensor 70 is positioned downstream from the vacuum pump 60 for measuring the mass flow rate of the gaseous content 102 pulled from packaging 100 by the vacuum pump 60. Alternatively, the mass flow rate sensor 70 may be positioned upstream from the vacuum pump 60. Of interest is the mass flow rate measured by the mass flow rate sensor 70 after the gaseous content 102 has been evacuated from the packaging 100 by the vacuum pump 60 and a steady state vacuum has been established within the packaging 100. The mass flow rate measured at this stage is indicative of the presence of a leak in the packaging 100 when the mass flow rate is greater than or equal to a threshold value and indicative of the absence of any leaks in the packaging 100 when the mass flow rate is less than the threshold value.

Selection of a practical threshold value depends upon a number of factors including the level of the vacuum pulled by the vacuum pump 60, the material from which the packaging 100 is constructed, etc. Generally, a threshold value of about 0.1 cm$^3$/min may be effectively employed as the threshold value when the vacuum pulled by the vacuum pump 60 is between about 4-8 lb/in$^2$.

Suitable gas mass flow rate sensors 70 for use in the instrument 10 are available from a number of sources, including MKS Instruments or Wilmington, Mass.

A pressure sensor 30 is employed between the needle 20 and the vacuum pump 60, preferably between the needle 20 and the oxygen sensor 40, for measuring and reporting the pressure within the packaging 100 while the vacuum pump 60 is operating.

The pressure sensor 30, oxygen sensor 40, optional valve 50, vacuum pump 60, and mass flow rate sensor 70 are preferably operably interconnected through a microcontroller or processor (not shown) for controlling operation of the various components, and receiving and processing the data signals generated by the various sensors. These components, along with the associated tubing 80 and a power source (not shown), are preferably retained within a single housing (not shown) which is equipped with (i) an inlet port (not shown) configured and arranged to attach to a length of tubing 80a in order to place the needle 20 into fluid communication with the components retained within the housing, and (ii) a user input device (not shown) and a visual display panel (not shown) for communicating with a user.

The instrument 10 may be constructed as a portable or desktop unit.

Use

A unit of packaging 100 having a solids content 101 and a gaseous content 102 is selected for analysis. A septum 200 is optionally adhered to the outer surface (unnumbered) of the packaging 100. The septum 200 and packaging 100 are perforated by the distal end 21 of the needle 20 a sufficient distance to place the lumen 29 into fluid communication with the interior contents of the packaging 100. The needle 20 is then left in the inserted position for the balance of the procedure. The balance of the procedure may be effected manually or automatically. The following disclosure shall be presented based upon automated operation of the instrument 10.

A user initiates analysis by pressing a START button (not shown). The valve 50 is actuated so as to place the needle 20 into fluid communication with the vacuum pump 60 and close the vent 90. Vacuum pump 60 is then activated to pull a sample of the gaseous content 102 from the packaging 100 into the oxygen sensor 40 through the length of tubing 80a. Typically a sample of about 2-5 ml is sufficient. The vacuum pump 60 is then deactivated, the valve 50 actuated to open the vent 90 and allow the pressure of the gaseous sample within the oxygen sensor 40 to be normalized. Once the pressure of the gaseous sample is normalized the valve 50 is actuated to close the vent 90 and the oxygen sensor 40 is activated to sense, record and report the oxygen concentration in the gaseous sample withdrawn from the packaging 100.

Upon completion of the analysis performed by the oxygen sensor 40, the oxygen sensor 40 is deactivated and the vacuum pump 60 activated to evacuate the gaseous content 102 from the packaging 100 and pull a vacuum. The mass flow rate sensor 70 is activated and the mass flow rate through the tubing 80 is sensed after the gaseous content 102 from the packaging 100 has been evacuated. The sensed mass flow rate may simply be recorded and reported, but is preferably first compared to a threshold value and the sensed mass flow rate recorded and reported along with an indicated of NO LEAK DETECTED when the mass flow rate at steady state vacuum is less than the threshold value, or an indication of LEAK DETECTED when the mass flow rate at steady state vacuum is greater than or equal to the threshold value. The vacuum pump 60 and mass flow rate sensor 70 are then deactivated.

We claim:

1. An instrument comprising:
   (a) a needle having a lumen;
   (b) a mass flow rate sensor in sealed fluid communication with the lumen defined by the needle; and
   (c) a vacuum pump in fluid communication with the lumen defined by the needle and in fluid communication with the mass flow rate sensor,
   (d) wherein the instrument is effective for evacuating gas from a hermetically sealed packaging through the lumen in the needle and directing mass flow from the evacuated packaging into operable contact with the mass flow rate sensor so as to permit sensing of any continuing mass flow from the evacuated packaging.

2. An instrument comprising:
   (a) a needle having a lumen;
   (b) an oxygen sensor in sealed fluid communication with the lumen defined by the needle;
   (c) a mass flow rate sensor in sealed fluid communication with the lumen defined by the needle; and
   (d) a vacuum pump in fluid communication with the lumen defined by the needle, and in fluid communication with the mass flow rate sensor,
   (e) wherein the instrument is effective for (i) pumping a sample of a gas from within a hermetically sealed packaging through the lumen of the needle and into operable contact with the oxygen sensor for permitting sensing of an oxygen concentration of the sample, (ii) evacuating the gaseous content of the hermetically sealed packaging, and (iii) directing mass flow from the evacuated packaging into operable contact with the mass flow rate sensor so as to permit sensing of any continuing mass flow from the evacuated packaging.

3. A method comprising the steps of:
   (a) selecting a hermetically sealed packaging;
   (b) puncturing the hermetically sealed packaging with a hollow needle having a lumen;
   (c) evacuating any gaseous content from within the hermetically sealed packaging through the lumen of the needle to form a vacuum within the hermetically sealed packaging; and
   (d) measuring mass flow rate from within the evacuated hermetically sealed packaging, whereby a mass flow rate from the evacuated hermetically sealed packaging above a threshold value indicates a leak in the hermetically sealed packaging.

4. A method comprising the steps of:
   (a) selecting a hermetically sealed packaging;
   (b) puncturing the hermetically sealed packaging with a hollow needle having a lumen;
   (c) pumping a sample of the gas within the hermetically sealed packaging through the lumen of the needle and into operable contact with an oxygen sensor for sensing the oxygen concentration in the sample;
   (d) evacuating the gaseous content from within the hermetically sealed packaging through the lumen of the needle to form a vacuum within the hermetically sealed packaging; and
   (e) measuring mass flow rate from the evacuated hermetically sealed packaging, whereby a mass flow rate from the evacuated hermetically sealed packaging above a threshold value indicates a leak in the hermetically sealed packaging.

\* \* \* \* \*